US011956368B2

(12) United States Patent
Blagodurov et al.

(10) Patent No.: US 11,956,368 B2
(45) Date of Patent: Apr. 9, 2024

(54) ENHANCED METHOD FOR A USEFUL BLOCKCHAIN CONSENSUS

(71) Applicant: Advanced Micro Devices, Inc., Santa Clara, CA (US)

(72) Inventors: Sergey Blagodurov, Bellevue, WA (US); Andrew G. Kegel, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 239 days.

(21) Appl. No.: 17/555,020

(22) Filed: Dec. 17, 2021

(65) Prior Publication Data

US 2023/0198772 A1    Jun. 22, 2023

(51) Int. Cl.
*H04L 29/06*      (2006.01)
*G06N 3/08*       (2023.01)
*H04L 9/32*       (2006.01)

(52) U.S. Cl.
CPC ............ *H04L 9/3239* (2013.01); *G06N 3/08* (2013.01)

(58) Field of Classification Search
CPC ... H04L 9/3239; H04L 2209/56; H04L 9/085; H04L 9/50; G06N 3/08; G06N 3/045; G06N 3/047; G06N 3/088
See application file for complete search history.

(56) References Cited

U.S. PATENT DOCUMENTS

| | | | |
|---|---|---|---|
| 10,068,228 B1 * | 9/2018 | Winklevoss | G06Q 20/34 |
| 11,157,899 B1 * | 10/2021 | Nelson | G06F 9/4401 |
| 11,362,832 B2 * | 6/2022 | Beberman | H04L 63/1466 |
| 2015/0302400 A1 * | 10/2015 | Metral | G06Q 40/12 705/75 |
| 2018/0276626 A1 * | 9/2018 | Laiben | G06Q 20/3829 |
| 2019/0109713 A1 * | 4/2019 | Clark | G06F 16/182 |
| 2019/0334920 A1 * | 10/2019 | Kelly | H04L 9/3239 |
| 2020/0233886 A1 * | 7/2020 | Hunt | G06F 16/24573 |
| 2020/0250752 A1 * | 8/2020 | Sugarman | H04L 9/3239 |
| 2020/0403984 A1 * | 12/2020 | Minehan | H04L 9/3247 |
| 2021/0004225 A1 * | 1/2021 | Karunakaran | G06F 8/71 |
| 2021/0067330 A1 * | 3/2021 | Rasmussen | H04L 9/0643 |

(Continued)

FOREIGN PATENT DOCUMENTS

| | | | | |
|---|---|---|---|---|
| CN | 110535639 A | * | 12/2019 | G06Q 20/065 |
| GB | 2599735 A | * | 4/2022 | G06F 21/64 |

*Primary Examiner* — John B King
(74) *Attorney, Agent, or Firm* — Hickman Becker Bingham Ledesma LLP

(57) ABSTRACT

An approach is provided for implementing a useful proof-of-work consensus algorithm. A proposed block is received. A combined hash value is generated based on the proposed block and a nonce value. The combined hash value is divided into a plurality of hash value pieces that each correspond to a work packet of a plurality of work packets. One or more requests are transmitted for the plurality of work packets that correspond to the plurality of hash value pieces. In response to receiving the plurality of work packets, a plurality of results is generated by performing, for each work packet of the plurality of work packets, one or more operations to complete work specified by the respective work packet. In response to determining that at least one result of the plurality of results satisfies one or more criteria, the proposed block is added to a blockchain maintained by the blockchain network.

16 Claims, 4 Drawing Sheets

(56) References Cited

U.S. PATENT DOCUMENTS

| | | | | |
|---|---|---|---|---|
| 2021/0240474 A1* | 8/2021 | Minehan | ............... | G06Q 20/389 |
| 2021/0258152 A1* | 8/2021 | Sung | ..................... | H04L 9/0825 |
| 2022/0209963 A1* | 6/2022 | Zhang | ................... | H04L 9/3239 |
| 2022/0391900 A1* | 12/2022 | Wuest | ................... | H04L 9/0897 |
| 2023/0089071 A1* | 3/2023 | Jørgensen | ........... | H04W 12/069 |
| | | | | 713/151 |
| 2023/0377049 A1* | 11/2023 | Floyd | ................... | H04L 9/0637 |

* cited by examiner

ENHANCED METHOD FOR A USEFUL BLOCKCHAIN CONSENSUS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Blockchain networks are increasingly popular in computational finance. As a consequence of the current design of consensus algorithms that are included in various blockchain networks, blockchain networks use a vast amount of energy, but always to a near-zero benefit. In particular, the energy cost for the nodes of a blockchain network to perform consensus algorithm operations—operations that are essential to the integrity of the blockchain—is enormous.

For example, the popular blockchain consensus algorithm proof-of-work operates by requiring nodes of a blockchain network to expend large amounts of energy to solve arbitrary mathematical puzzles in order to reach consensus among the nodes of the blockchain network on transactions that are proposed to be added to the blockchain.

The computations that are executed during consensus algorithm operations, e.g. solving arbitrary mathematical puzzles, are useful for ensuring the integrity of a blockchain network but provide little to no benefit outside of the blockchain network itself. Thus, there is a need for an approach for providing a more useful consensus algorithm for a blockchain network.

BRIEF DESCRIPTION OF THE DRAWINGS

Implementations are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the Implementations. It will be apparent, however, to one skilled in the art that the Implementations are be practiced without these specific details. In other instances, well-known structures and devices are shown in block diagram form in order to avoid unnecessarily obscuring the Implementations.

I. Overview
II. Architecture
III. Blockchain Overview
IV. Useful Proof of Work Consensus I. Overview An approach is provided for implementing a useful proof-of-work consensus algorithm. A proposed block is received by a node of a blockchain network. A combined hash value is generated based on the proposed block and a nonce value. The combined hash value is divided into a plurality of hash value pieces, where each hash value piece of the plurality of hash value pieces corresponds to a work packet of a plurality of work packets. One or more requests are generated and transmitted for the plurality of work packets that correspond to the plurality of hash value pieces. In response to receiving the plurality of work packets, a plurality of results is generated by performing, for each work packet of the plurality of work packets, one or more operations to complete work specified by the respective work packet. It is then determined whether at least one result of the plurality of results satisfies one or more criteria. In response to determining that at least one result of the plurality of results satisfies the one or more criteria, the proposed block is added to a blockchain that is maintained by the blockchain network.

Techniques discussed herein support the conservation of computing resources by performing multipurpose computations as part of a useful proof-of-work consensus algorithm that can be used to solve external problems in addition to performing blockchain consensus operations. For example, computations used for performing a useful proof-of-work consensus algorithm can additionally be used for tasks such as finding an improved solution for a problem using machine-learning GAN technology, using image-processing competition to find significant features in astrophotography images, using mathematical analysis to find signals in a search for extraterrestrial intelligence (SETI) signal, or using cryptography to "crack" an encrypted message.

II. Architecture

Figure 1:
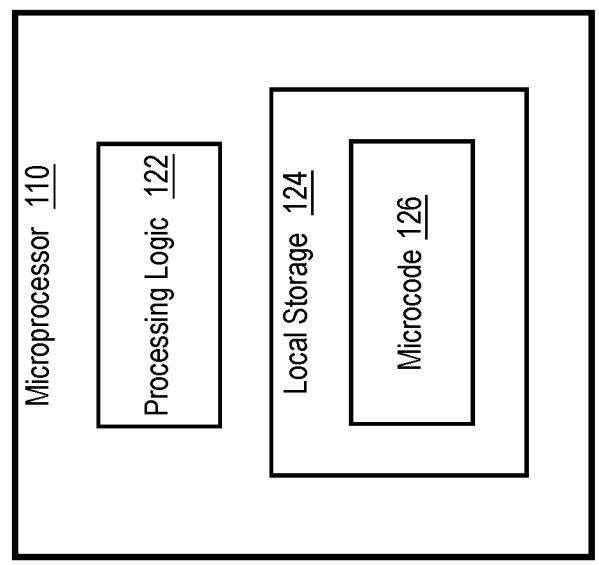
FIG. 1 is a block diagram that depicts a microprocessor for implementing a useful proof-of-work consensus algorithm as described herein.

FIG. 1 is a block diagram that depicts a microprocessor 110 for implementing a useful proof-of-work consensus algorithm as described herein. Microprocessor 110 includes processing logic 122 and local storage 124.

In one implementation, the microprocessor 110 may be any type of Central Processing Unit (CPU), Graphics Processing Unit (GPU), application-specific integrated circuit (ASIC), or logic capable of processing commands. The microprocessor 110 may include any number of cores that may vary depending upon a particular implementation and implementations are not limited to any particular number of cores.

Processing logic 122 may be any type of Central Processing Unit (CPU), Graphics Processing Unit (GPU) or logic capable of processing and/or executing microcode 126.

Local storage 124 includes microcode 126. Microcode 126 includes hardware-level instructions that can control, coordinate, and in some cases perform operations required by microprocessor 110. For example, microcode 126 may comprise microcode for performing useful proof-of-work consensus computations. In another example, microcode 126 may comprise microcode for executing machine learning models. Examples of microcode 126 are further discussed herein.

In other implementations, microprocessor 110 may include other elements not described herein. For example, microprocessor 110 may include a bank of registers for storing one more criteria values.

III. Blockchain Overview

Figure 2:
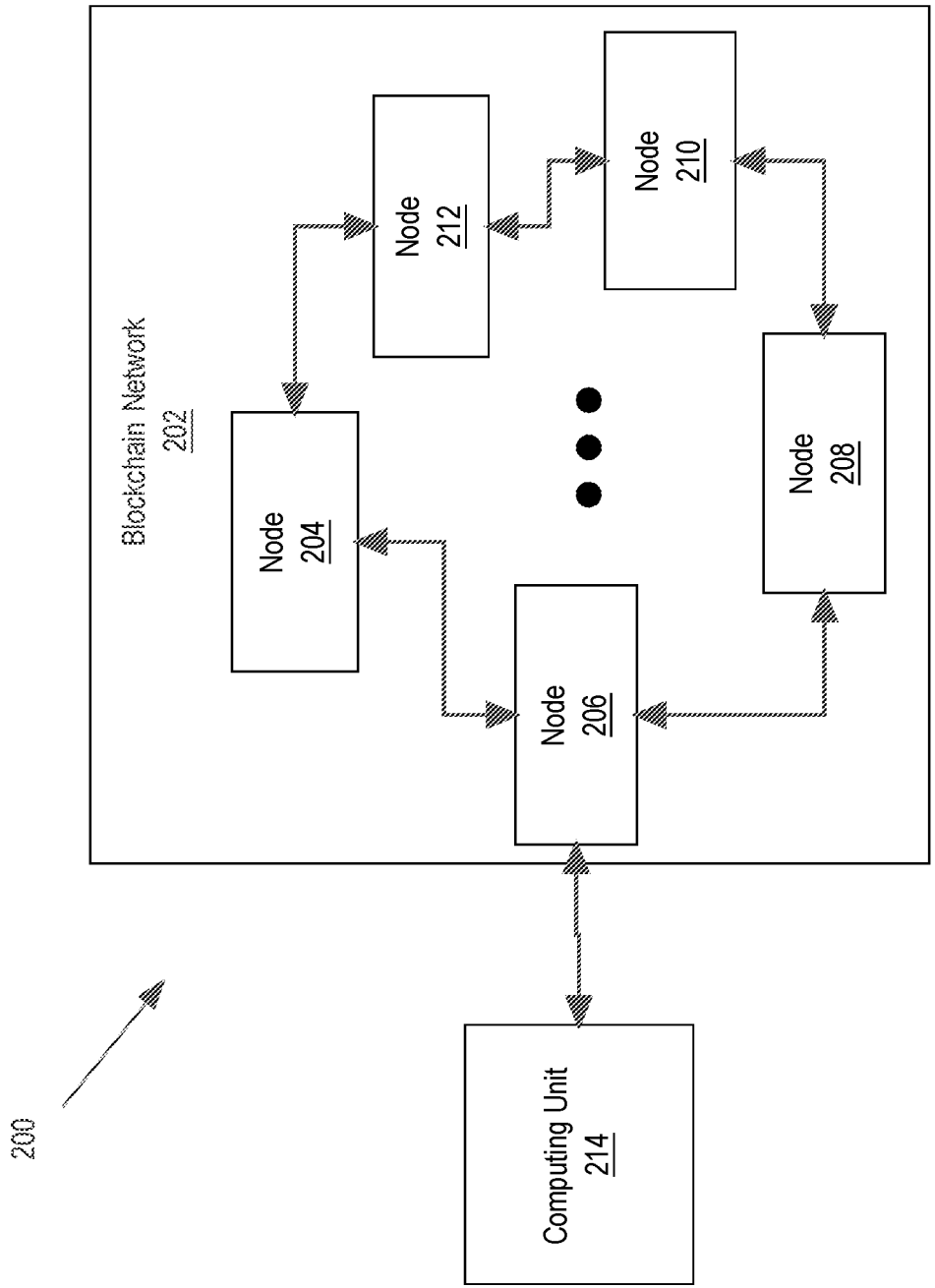
FIG. 2 is a block diagram that depicts an implementation of a blockchain network.

FIG. 2 depicts an implementation of a blockchain network, which comprises a plurality of nodes 204, 206, 208, 210, 212 and may be implemented by a plurality of computing units, such as microprocessor 110 as shown in FIG. 1. Blockchain network 202 represents a computing environment for operating a decentralized framework that maintains a distributed data structure, which may be referred to herein as a secure distributed transaction ledger or a blockchain. This blockchain may support various functions, such as distributing computational tasks from one or more systems to one or more other systems, or interfacing and sharing data with other blockchains, among other functions.

To maintain the blockchain among the various nodes 204, 206, 208, 210, 212 in the blockchain network 202, a set of procedures are followed. Generally, such a network would suffer from inherent uncertainty and distrust between the nodes when they transact because they are typically unaffiliated with each other, may be transacting across vast distances, may be transacting anonymously, and because there is no centralized control or management to monitor or to resolve disputes. However, because the blockchain is maintained by each node in the blockchain network and because it is maintained according to set procedures that employ cryptographic methods and a consensus mechanism, the uncertain and distrust elements are mitigated.

Thus, the secure distributed transaction ledger, or blockchain, is a ledger maintained collectively by the nodes in blockchain network 202. The blockchain includes blocks with digital data regarding recent transactions and/or messages, linking data that links one block to its previous block in the blockchain, consensus data that ensures that the state of the blockchain is valid, and is endorsed by the majority of the record keeping systems. Furthermore, all confirmed transactions are included in the blockchain and are done so using cryptography. This way, the integrity and the chronological order of the blockchain are enforced and can be independently verified by each node.

Digital data may be received by one or more nodes in the blockchain network 202 for inclusion in the blockchain. This digital data is generally referred to as a "transaction" and is made available generally to the nodes in the blockchain network 202. One or more computing units 214, such as a microprocessor, may be configured to connect to the blockchain network to publish digital data to blocks of the blockchain.

In one example, items or digital assets, often referred to as "tokens" or "coins" are created and stored in a block of a blockchain. The item or digitial asset can be any value, or set of values. Each time any operation is performed involving an item or asset that is identified in a blockchain, the operation is recorded in a proposed block of the blockchain as a "transaction entry" and the proposed block is added to the blockchain. The operation may be, for example, a change in ownership of the item or asset.

For a given item or asset, the blocks of a blockchain may have transaction entries for changes to attributes of the item or asset, transfers in ownership of the item or asset, etc. Individual items or assets may be tracked on a single blockchain thoughout the lifetime of the asset, thereby enabling the history of the asset to be immutably stored, monitored, and verified by any interested entity.

When a transaction is initially received by a node, the node groups the transaction with other transactions into transaction entries of a proposed block. The proposed block is broadcasted to other nodes of the blockchain network according to a consensus algorithm. A consensus algorithm may be defined as the mechanism through which a blockchain network reaches consensus. Blockchains are built as distributed systems and, since they do not rely on a central authority, the nodes need to agree on the validity of transactions. Consensus algorithms ensure that consensus protocol rules are being followed and guarantee that all transactions occur in a trustless way.

A common consensus algorithm used in blockchain networks is a "proof-of-work" consensus algorithm. Proof-of-work consensus algorithms require providing an answer or result, also known as a proof, to an arbitrarty mathematical puzzle that is hard to solve yet can be easily verified by nodes of a blockchain network in order for a node to gain the right to update a blockchain.

Figure 3:
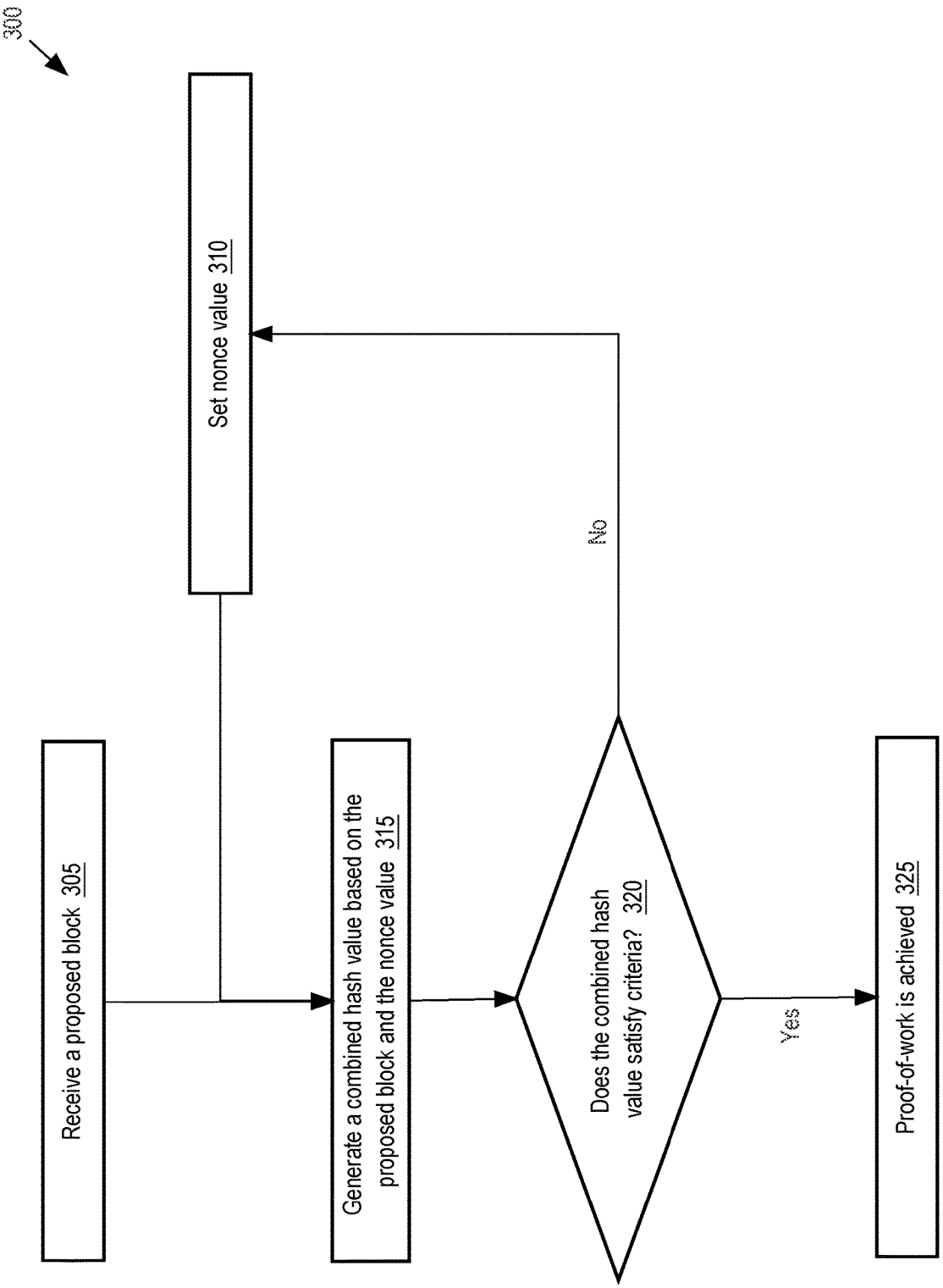
FIG. 3 is a flow diagram that depicts an approach for executing a proof-of-work consensus algorithm.

FIG. 3 is a flow diagram 300 that depicts an approach for executing a proof-of-work consensus algorithm using microprocessor 110 from FIG. 1.

In step 305, a proposed block is received by microprocessor 110. The proposed block may include digital data such as transaction entries. According to an implementation, a transaction entry includes information regarding a transaction, such as items or assets, or corresponding hash-values for items or assets included in the transaction, and transaction data. The transaction data may comprise information or data about the transaction such as the entities included in the transaction and general information about the transaction. A proposed block may comprise other digital data including a unique identifier of the sender of the data (or owner/originator/sender of the data), a hash value of the previous block of the blockchain, a number of the proposed block, timestamps, a nonce value, and any other data item.

In step 310, a nonce value is set for the proposed block by microprocessor 110. The nonce value is a random value that is altered on each iteration, i.e. a number that is only used once. For example, a nonce value may initially be set to the value of "62" and then incremented or altered on each iteration.

In step 315, a combined hash value is generated based on the proposed block and the nonce value by microprocessor 110. For example, the contents of the proposed block from step 305 and the nonce value from step 310 may be combined or concatenated and hashed using a hash function or algorithm to generate the combined hash value. Any hash function or algorithm, such as SHA-256, can be used to generate the combined hash value.

In step 320, microprocessor 110 determines whether the combined hash value satisfies certain criteria. For example, it may be determined whether the combined hash value from step 315 is less than a target value. The target value may be a threshold that is determined by mining difficulty of the blockchain network that the combined hash value must be less than or contain a given count of Os for a proposed block to be added to the blockchain.

In step 325, if the combined hash value satisfies certain criteria, proof-of-work is achieved. As a result of achieving the proof-of-work, the proposed block is added to the blockchain. A reward may also be distributed to a blockchain address associated with microprocessor 110. If the combined hash value does not satisfy certain criteria, proof-of-work is not achieved and the flow proceeds to step 310 where a new nonce value is set. The new nonce value is set to be different from the original nonce value. Once the new nonce value is set, step 315 is performed on the proposed block and the new nonce to generate a new combined hash value. The new combined hash value is compared against the criteria in step 320 to determine whether the new combined hash value satisfies certain criteria. Steps 310-320 repeat until a combined hash value is found that satisfies the criteria or the node performing the operations is notified of a new proposed block.

Although proof-of-work consensus provides effective security in a blockchain network, the existing proof-of-work algorithm as shown in FIG. 3 is (a) computationally expensive by requiring nodes to expend large amounts of energy to solve arbitrary mathematical puzzles and (b) relatively useless by providing little to no benefit outside of the blockchain network itself.

IV. Useful Proof of Work Consensus

Figure 4:
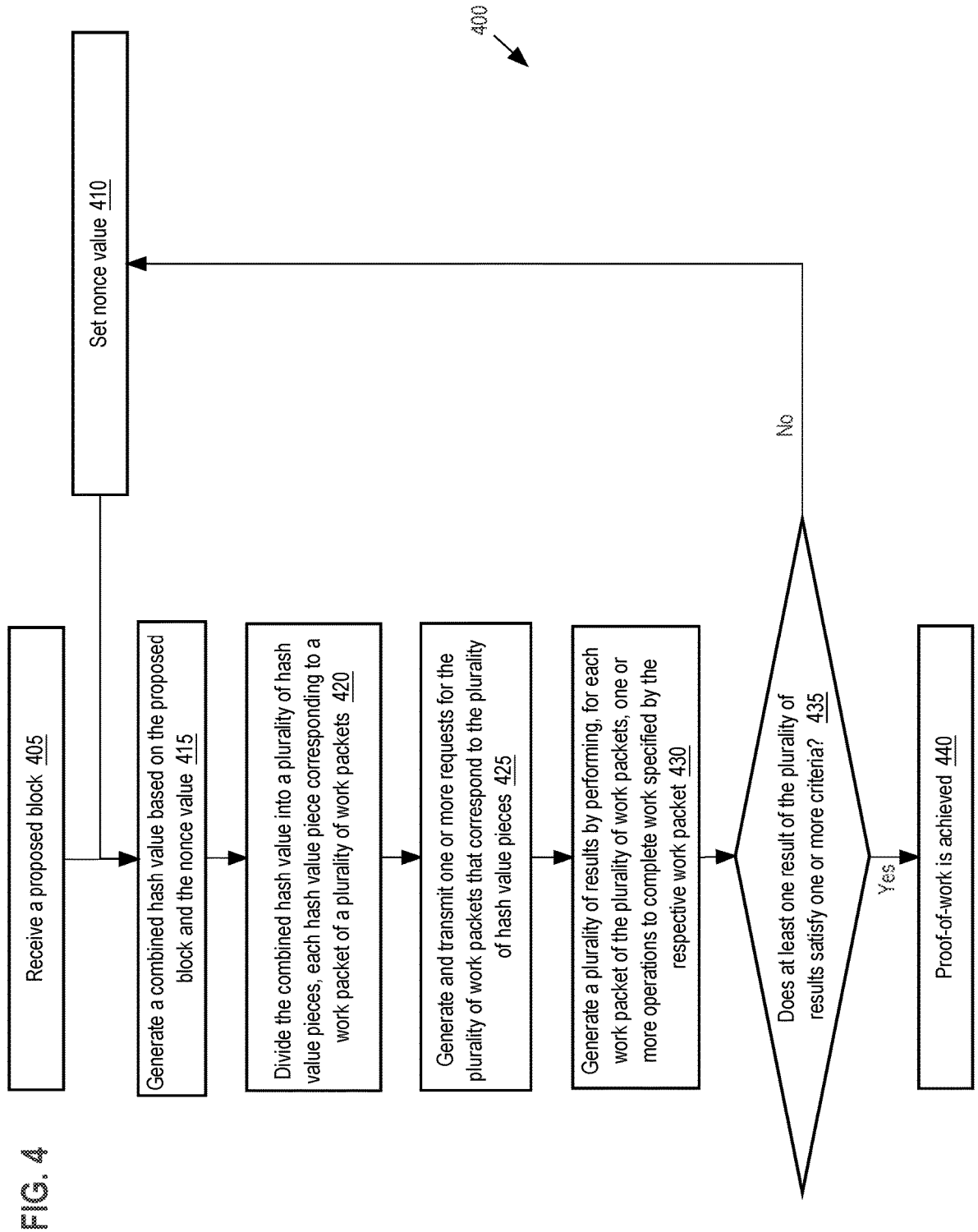
FIG. 4 is a flow diagram that depicts an approach for executing a useful proof-of-work consensus algorithm.

The existing proof-of-work consensus algorithm can be modified perform useful work while also enhancing security of a blockchain network. FIG. 4 is a flow diagram 400 that depicts an approach for performing useful proof-of-work consensus using microprocessor 110.

In step 405, a proposed block is received by microprocessor 110. The proposed block may include digital data such as transaction entries that are to be added to a blockchain of a blockchain network. According to an implementation, a transaction comprises information regarding a transaction, such as items or assets, or corresponding hash-values for items or assets included in the transaction, and transaction data. The transaction data may comprise information or data about the transaction such as the entities included in the transaction and general information about the transaction. A proposed block may comprise other digital data including a unique identifier of the sender of the data (or owner/originator/sender of the data), a hash value of the previous block of the blockchain, a number of the proposed block, timestamps, a nonce value, and any other data item.

In step 410, a nonce value is set for the proposed block by microprocessor 110. The nonce value is a random value that is altered on each iteration, i.e. a number that is only used once. For example, a nonce value may initially be set to the value of "62" and then incremented or altered on each iteration.

In step 415, a combined hash value is generated based on the proposed block and the nonce value by microprocessor 110. For example, the contents of the proposed block from step 305 and the nonce value from step 310 may be combined or concatenated and hashed using a hash function or algorithm to generate the combined hash value. Any hash function or algorithm, such as SHA-256, can be used to generate the combined hash value.

In step 420, the combined hash value is divided into a plurality of hash value pieces by microprocessor 110. Each hash value piece of the plurality of hash value pieces corresponds to a work packet of a plurality of work packets. For example, the combined hash value can be divided into N hash value pieces based on the size of the combined hash value. Each hash value piece of the plurality of hash value pieces serves as an offset value or index value for a work packet of a plurality of work packets that are stored in a data repository. Each work packet of the plurality of work packets may specify one or more data samples that work is to be performed on. The work may include one or more jobs, tasks, steps, and/or computations. An example of "work" may include tasks such as screening data samples such as novel protein structures in the search for a cure for COVID-19. Other examples include tasks for identifying breast cancer, kidney cancer, Dengue fever, Chagas, Zika, Hepatitis C, Ebola, Alzheimer's, Huntington's, and Parkinson's diseases among large data samples and/or datasets.

In step 425, one or more requests are generated for the plurality of work packets that correspond to the plurality of hash value pieces by microprocessor 110. For example, the plurality of work packets may be stored and managed in an external data repository. One or more requests can be generated and transmitted to the external repository over a network to retrieve the plurality of work packets.

In step 430, in response to receiving the plurality of work packets, a plurality of results is generated by performing, by microprocessor 110, for each work packet of the plurality of work packets, one or more operations to complete work specified by the respective work packet. In some implementations, microprocessor 110 performs one or more operations on each work packet of the plurality of work packets in parallel. For example, a first core of microprocessor 110 performs one or more operations on a first work packet of the plurality of work packets to generate a first result of the plurality of results while a second core of microprocessor 110 performs one or more operations on a second work packet of the plurality of work packets to generate a second result of the plurality of results.

In step 435, microprocessor 110 determines whether at least one result of the plurality of results satisfies one or more criteria. For example, it may be determined whether at least one result of the plurality of results is above or below a threshold or satisfies some other condition. The one or more criteria may be specified by one or more work packets received by microprocessor 110, or may be configured by an administrator.

In step 435, if at least one result of the plurality of results satisfies one or more criteria, proof-of-work is achieved. In some implementations, the at least one result of the one or more results that satisfies the one or more criteria and a work packet identification (ID) of a work packet of the plurality of work packets that corresponds to the at least one result are transmitted to one or more nodes of the blockchain network that the proposed block is to be added to. The one or more nodes of the blockchain network perform operations to "prove" that the one or more criteria is satisfied by recreating the at least one result and confirming the at least one result against the one or more criteria. In some implementations, when a confirmation is received that the one or more nodes of the blockchain network have confirmed the at least one result, the at least one result is recorded in the proposed block and the proposed block is added to the blockchain. Additionally, a reward may also be distributed to a blockchain address associated with microprocessor 110.

Alternatively, if at least one result of the plurality of results does not satisfy the one or more criteria, proof-of-work is not achieved and the flow proceeds to step 410 where a new nonce value is set. The new nonce value is set to be different from the original nonce value. Once the new nonce value is set, step 415 is performed on the proposed block and the new nonce value to generate a new combined hash value. The new combined hash value is divided into a new plurality of hash value pieces in step 420 to provide a new set of indexes or offsets for a new plurality of work packets. Steps 425-435 are performed to request the new plurality of work packets, generate a new plurality of results by performing work for each of the new plurality of work packets, and determine whether the new plurality of results satisfies one or more criteria. Steps 410-435 repeat until a result is found that satisfies the one or more criteria or the node performing the operations is notified of a new proposed block.

In one implementation, microprocessor 110 implements a machine learning model. The machine learning model is used to generate the plurality of results by evaluating each work packet of the plurality of work packets. Each result of the plurality of results comprises a loss score for the machine learning model.

In some implementations, the machine learning model comprises a generator component or discriminator component of a generative adversarial network (GAN). A GAN is a system of two machine learning models contesting with each other in a zero-sum game framework. One machine learning model of a GAN, referred to herein as a generator component, generates work packets comprising synthetic data samples ("synthetic work packets"), and the other machine learning model of the GAN, referred to herein as a discriminator component, evaluates work packets. Each machine learning model of the GAN attempts to best the other—the generator component's objective is to fool the discriminator component with synthetic work packets and the discriminator component's objective is to not be fooled by the synthetic work packets generated by the generator component. Backpropagation is applied in both machine learning models so that the generator component produces better synthetic work packets, while the discriminator component becomes more skilled at flagging synthetic work packets.

For example, a generator component of a GAN can generate synthetic work packets comprising photorealistic images or sounds. A discriminator component of the GAN can receive work packets comprising authentic data samples such as real images or sounds ("authentic work packets") from an external repository, and synthetic work packets generated by the generator component of the GAN. During an epoch, the discriminator component of the GAN attempts to identify whether each received work packet is synthetic or authentic. After evaluating each received work packet, a loss score is calculated for the generator component of the GAN and the discriminator component of the GAN. For the generator component, the loss score is equal to a share of work packets generated by the generator component that were incorrectly identified by the discriminator component, i.e. the share of synthetic work packets that fooled the discriminator component. For the discriminator component, the loss score is equal to the share work packets that were correctly identified by the discriminator component. After a set number of epochs, the discriminator component or the generator component of the GAN that includes a loss score that satisfies one or more criteria is declared the winner. The loss score of the winner is shared with one or more nodes of the blockchain network, who then perform operations to verify the loss score on their respective inference models. If the one or more nodes confirm the winner, the proposed block is added to the blockchain. Because inference hardware is much cheaper than the training hardware for the generator and discriminator components of the GAN, the cost to verify results is asymmetrically lower than the cost of generating the results.

A generator component of a GAN that is produced from a large blockchain network deployment that implements useful blockchain consensus techniques as discussed herein generates high quality synthetic data that is very similar to real data. Such high quality synthetic data can be used for training other models and thus eliminates the need for sourcing large amounts of training data. For instance, the generator component could create very photorealistic images that could be used to train other models or for any other task. The capability to circumvent the need for training data conserves computing resources and reduces barrier to entry in the data analysis sector. For example, small entities that do not possess the computing resources or volumes of data as large entities will be able to perform the same tasks using a fraction of the computing resource expenditures. Thus, the techniques discussed herein are drastically reduce the entry level to big data analysis and enhance the conservation of computing resources by reusing computations for multiple purposes.

The invention claimed is:

1. A method comprising: generating a combined hash value based on a proposed block and a nonce value, the proposed block to be added to a blockchain that is maintained by a blockchain network; dividing the combined hash value into a plurality of hash value pieces, each hash value piece of the plurality of hash value pieces corresponding to a work packet of a plurality of work packets; in response to receiving the plurality of work packets, generating a plurality of results by performing, for each work packet of the plurality of work packets, one or more operations to complete work specified by the work packet; determining whether at least one result of the plurality of results satisfies one or more criteria; and in response to determining that the at least one result of the plurality of results satisfies the one or more criteria, adding the proposed block to the blockchain.

2. The method of claim 1, wherein adding the proposed block to a blockchain includes:
transmitting the at least one result of the plurality of results to one or more nodes of the blockchain network, the one or more nodes configured to verify that the at least one result satisfies the one or more criteria;
receiving confirmation from the one or more nodes that the at least one result satisfies the one or more criteria and in response, adding the proposed block to the blockchain.

3. The method of claim 1, further comprising: in response to determining that the at least one result of the plurality of results does not satisfy the one or more criteria, generating a new combined hash value based on the proposed block and a new nonce value that is different than the nonce value; dividing the new combined hash value into a new plurality of hash value pieces, each hash value piece of the new plurality of hash value pieces corresponding to a work packet of a new plurality of work packets; in response to receiving the new plurality of work packets, generating a new plurality of results by performing, for each work packet of the new plurality of work packets, one or more operations to complete work specified by the work packet; determining whether at least one new result of the new plurality of results satisfies the one or more criteria; in response to determining that the at least one new result of the new plurality of results satisfies the one or more criteria, adding the proposed block to the blockchain.

4. The method of claim 1, wherein the plurality of work packets is received from an external data repository that is accessible over a network.

5. The method of claim 1, wherein generating the plurality of results includes using a machine learning model to evaluate each work packet of the plurality of work packets; wherein determining whether the at least one result of the plurality of results satisfies one or more criteria comprises determining whether a loss score associated with the machine learning model satisfies one or more criteria.

6. The method of claim 5, wherein the machine learning model comprises a generator component of a generative adversarial network (GAN), the GAN including the generator component and a discriminator component; wherein the loss score is equal to a share of work packets of the plurality of work packets generated by the generator component that were incorrectly identified by the discriminator component of the GAN.

7. The method of claim 5, wherein the machine learning model comprises a discriminator component of a generative adversarial network (GAN), the GAN including a generator component and the discriminator component;

wherein the loss score is equal to a share of work packets of the plurality of work packets that were correctly identified by the discriminator component of the GAN.

8. The method of claim 1, wherein a first core of a microprocessor performs one or more operations on a first work packet of the plurality of work packets to generate a first result of the plurality of results while a second core of the microprocessor performs one or more operations on a second work packet of the plurality of work packets to generate a second result of the plurality of results.

9. A microprocessor comprising logic configured to cause: generating a combined hash value based on a proposed block and a nonce value, the proposed block to be added to a blockchain that is maintained by a blockchain network; dividing the combined hash value into a plurality of hash value pieces, each hash value piece of the plurality of hash value pieces corresponding to a work packet of a plurality of work packets; in response to receiving the plurality of work packets, generating a plurality of results by performing, for each work packet of the plurality of work packets, one or more operations to complete work specified by the work packet; determining whether at least one result of the plurality of results satisfies one or more criteria; in response to determining that the at least one result of the plurality of results satisfies the one or more criteria, adding the proposed block to the blockchain.

10. The microprocessor of claim 9, wherein adding the proposed block to a blockchain includes:

transmitting the at least one result of the plurality of results to one or more nodes of the blockchain network, the one or more nodes configured to verify that the at least one result satisfies the one or more criteria;

receiving confirmation from the one or more nodes that the at least one result satisfies the one or more criteria and in response, adding the proposed block to the blockchain.

11. The microprocessor of claim 9, wherein the microprocessor is further configured to cause: in response to determining that the at least one result of the plurality of results does not satisfy the one or more criteria, generating a new combined hash value based on the proposed block and a new nonce value that is different than the nonce value; dividing the new combined hash value into a new plurality of hash value pieces, each hash value piece of the new plurality of hash value pieces corresponding to a work packet of a new plurality of work packets; in response to receiving the new plurality of work packets, generating a new plurality of results by performing, for each work packet of the new plurality of work packets, one or more operations to complete work specified by the work packet; determining whether at least one new result of the new plurality of results satisfies the one or more criteria; in response to determining that the at least one new result of the new plurality of results satisfies the one or more criteria, adding the proposed block to the blockchain.

12. The microprocessor of claim 9, wherein the plurality of work packets is received from an external data repository that is accessible over a network.

13. The microprocessor of claim 9, wherein generating the plurality of results includes using a machine learning model to evaluate each work packet of the plurality of work packets; wherein determining whether the at least one result of the plurality of results satisfies one or more criteria comprises determining whether a loss score associated with the machine learning model satisfies one or more criteria.

14. The microprocessor of claim 13, wherein the machine learning model comprises a generator component of a generative adversarial network (GAN), the GAN including the generator component and a discriminator component; wherein the loss score is equal to a share of work packets of the plurality of work packets generated by the generator component that were incorrectly identified by the discriminator component of the GAN.

15. The microprocessor of claim 13, wherein the machine learning model comprises a discriminator component of a generative adversarial network (GAN), the GAN including a generator component and the discriminator component;

wherein the loss score is equal to a share of work packets of the plurality of work packets that were correctly identified by the discriminator component of the GAN.

16. The microprocessor of claim 9, wherein a first core of the microprocessor performs one or more operations on a first work packet of the plurality of work packets to generate a first result of the plurality of results while a second core of the microprocessor performs one or more operations on a second work packet of the plurality of work packets to generate a second result of the plurality of results.

* * * * *